US010762663B2

(12) United States Patent
Cricri et al.

(10) Patent No.: US 10,762,663 B2
(45) Date of Patent: Sep. 1, 2020

(54) APPARATUS, A METHOD AND A COMPUTER PROGRAM FOR VIDEO CODING AND DECODING

(71) Applicant: Nokia Technologies Oy, Espoo (FI)

(72) Inventors: Francesco Cricri, Tampere (FI); Miika Tupala, Tampere (FI)

(73) Assignee: Nokia Technologies Oy, Espoo (FI)

( * ) Notice: Subject to any disclaimer, the term of this patent is extended or adjusted under 35 U.S.C. 154(b) by 137 days.

(21) Appl. No.: 15/951,976

(22) Filed: Apr. 12, 2018

(65) Prior Publication Data

US 2018/0336702 A1 Nov. 22, 2018

(30) Foreign Application Priority Data

May 16, 2017 (GB) .................................. 1707792.6

(51) Int. Cl.
*G06K 9/00* (2006.01)
*G06T 7/73* (2017.01)
(Continued)

(52) U.S. Cl.
CPC ............ *G06T 7/75* (2017.01); *G06K 9/00771* (2013.01); *G06K 9/00899* (2013.01);
(Continued)

(58) Field of Classification Search
None
See application file for complete search history.

(56) References Cited

U.S. PATENT DOCUMENTS 8,279,254 B2  10/2012  Goose et al.
8,601,386 B2  12/2013  Altberg et al.
(Continued)

FOREIGN PATENT DOCUMENTS

CN     102549655 A    7/2012
WO    2016/183380 A1  11/2016

OTHER PUBLICATIONS

Escolano et al.,"Holoportation: Virtual 3D Teleportation in Real-time", UIST 2016, Oct. 16-19, 2016 (Year: 2016).*
(Continued)

*Primary Examiner* — Randolph I Chu
(74) *Attorney, Agent, or Firm* — Harrington & Smith

(57) ABSTRACT

A method for analyzing a presence of objects within a space provided with a capturing system comprising a plurality of camera devices and a playback system for reproducing audio and/or visual signals in the space, the method comprising obtaining a first 3D volumetric representation of a scene within the space, generated on the basis of input streams of at least a first and a second camera device, said first 3D volumetric representation showing at least one object within the scene; sending probe signals to a processing unit; controlling the processing unit to reproduce, using the playback system, one or more audio and/or visual signals on the basis of the probe signals into the space; controlling the processing unit to capture a second 3D volumetric representation of the scene including reproductions of the one or more audio and/or visual signals within the space; and analyzing the reproductions of the one or more audio and/or visual signals captured within the first space whether they correspond to a presumed location of the at least one object shown in the first 3D volumetric representation.

20 Claims, 7 Drawing Sheets

(51) Int. Cl.
*H04N 7/15* (2006.01)
*H04N 5/225* (2006.01)
*H04N 13/243* (2018.01)
*G10L 25/30* (2013.01)
*G10L 25/57* (2013.01)
*H04N 13/00* (2018.01)

(52) U.S. Cl.
CPC .............. *G10L 25/30* (2013.01); *G10L 25/57* (2013.01); *H04N 5/225* (2013.01); *H04N 7/15* (2013.01); *H04N 13/243* (2018.05); *H04N 2013/0085* (2013.01)

(56) References Cited

U.S. PATENT DOCUMENTS

| | | | |
|---|---|---|---|
| 8,675,067 | B2 | 3/2014 | Chou et al. |
| 9,544,543 | B2 | 1/2017 | Setton |
| 2012/0123786 | A1 | 5/2012 | Valin et al. |
| 2013/0148851 | A1 | 6/2013 | Leung et al. |
| 2016/0217615 | A1 | 7/2016 | Kraver |
| 2019/0346932 | A1* | 11/2019 | Dai .................. G06F 3/017 |

OTHER PUBLICATIONS

Lazik et al., "Indoor Pseudo-ranging of Mobile Devices using Ultrasonic Chirps", Sensys 12, Nov. 12, (Year: 2012).*

Mulatti et al. "The role of the sound of objects in object identification: evidence from picture naming" frontiers in psychology, Oct. 2014 (Year: 2014).*

Extended European Search Report received for corresponding European Patent Application No. 18168867.2, dated Oct. 25, 2018, 10 pages.

Kainz et al., "OmniKinect: Real-Time Dense Volumetric Data Acquisition and Applications", Proceedings of the 18th ACM symposium on Virtual reality software and technology, Dec. 10-12, 2012, pp. 25-32.

"Multi-view 3D Models from Single Images with a Convolutional Network", YouTube, Retrieved on Apr. 2, 2018, Webpage available at : https://www.youtube.com/watch?v=uf4-I6h7iGM.

Barakonyi et al., "Remote Collaboration Using Augmented Reality Videoconferencing", Proceedings of Graphics Interface, May 17-19, 2004, pp. 89-96.

Search Report received for corresponding United Kingdom Patent Application No. 1707792.6, dated Oct. 31, 2017, 5 pages.

* cited by examiner

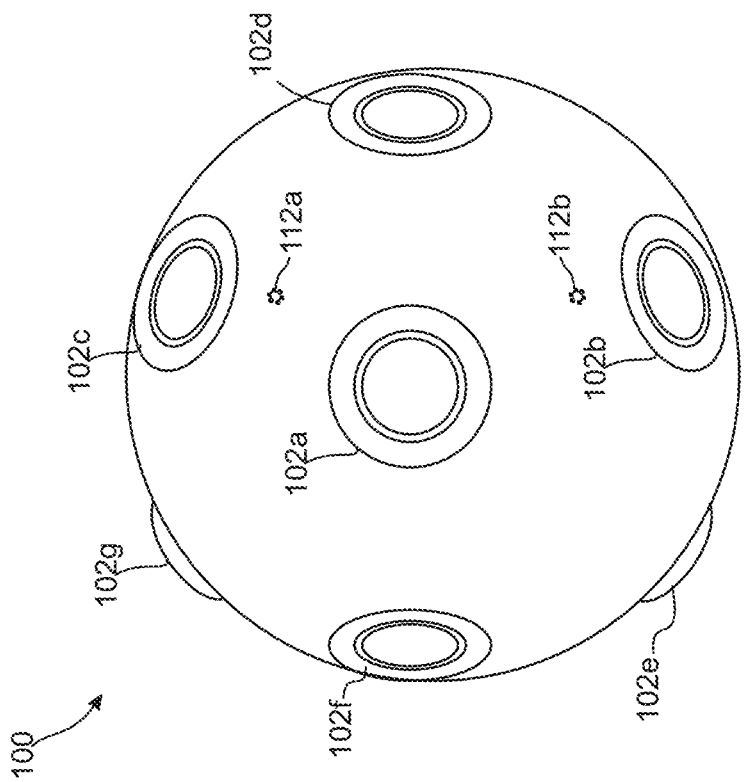
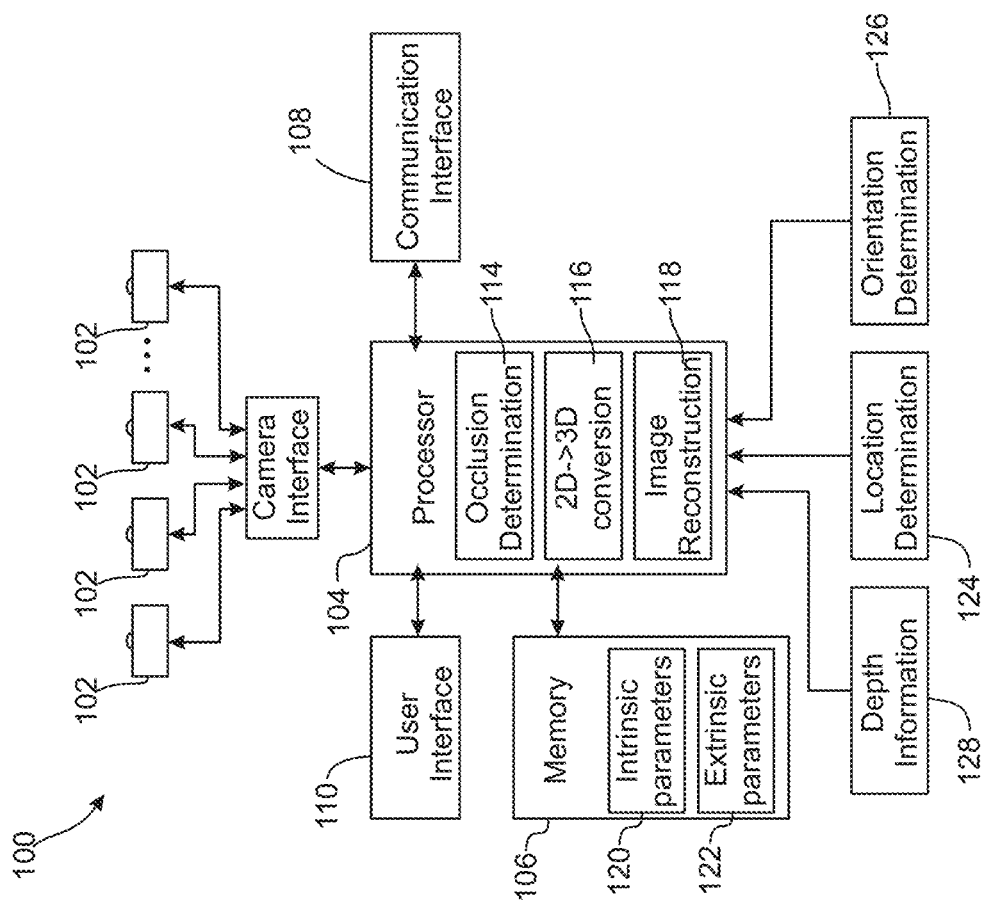

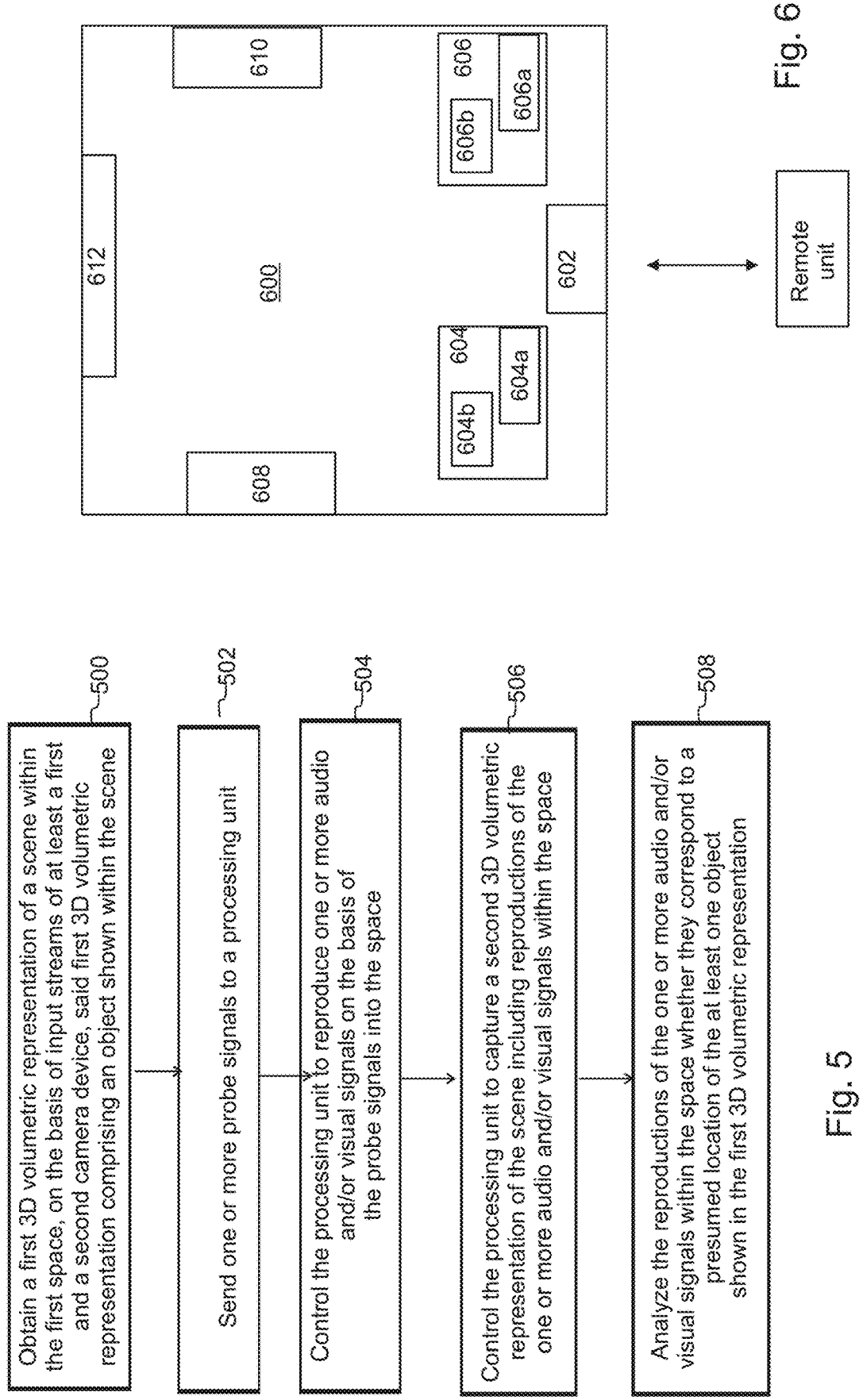

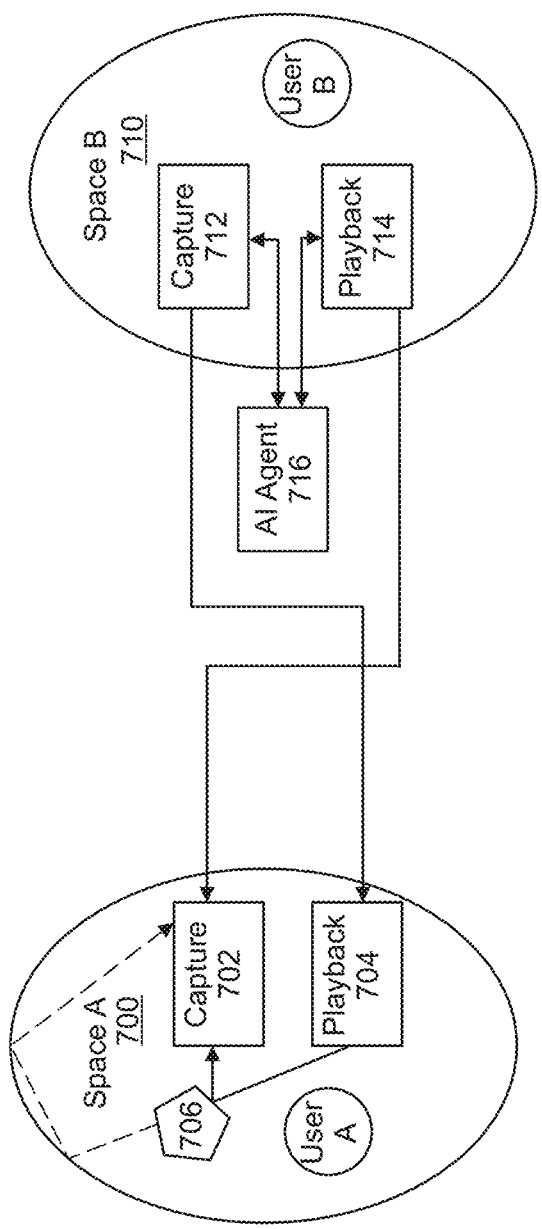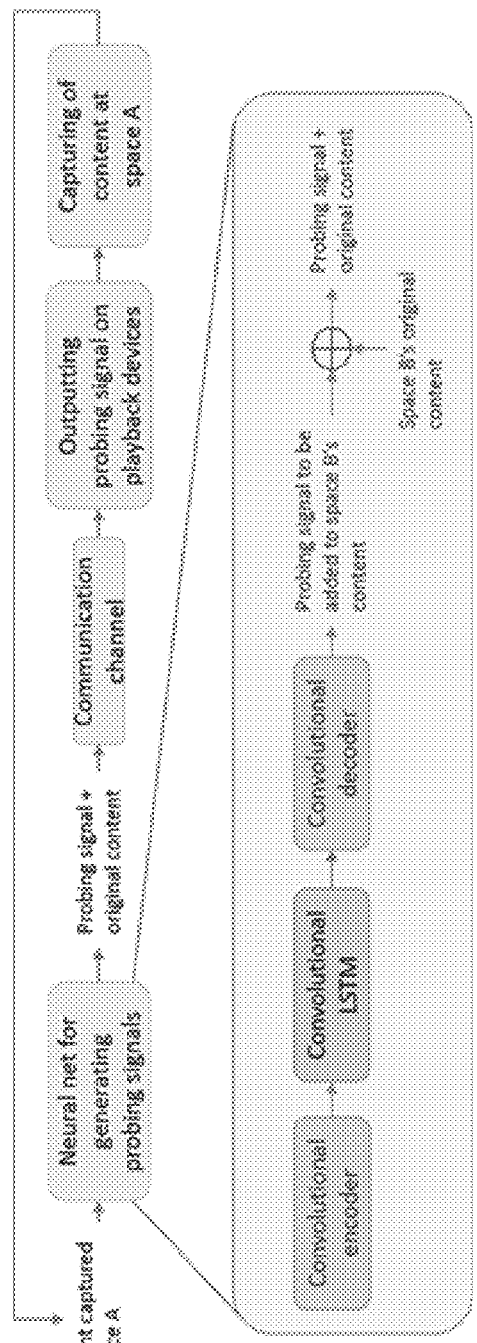

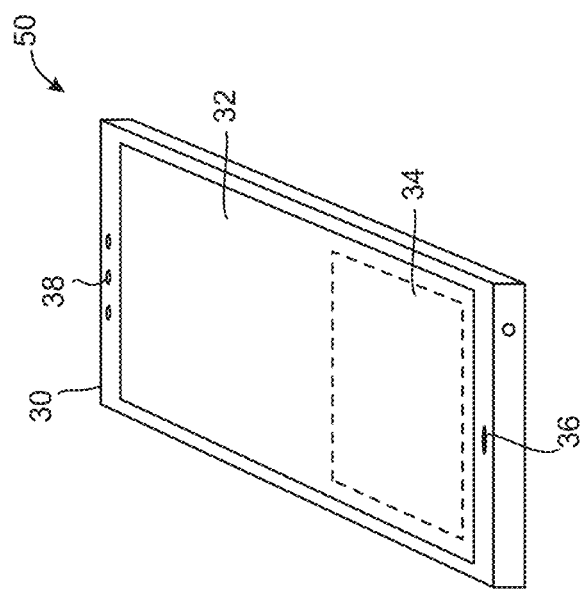
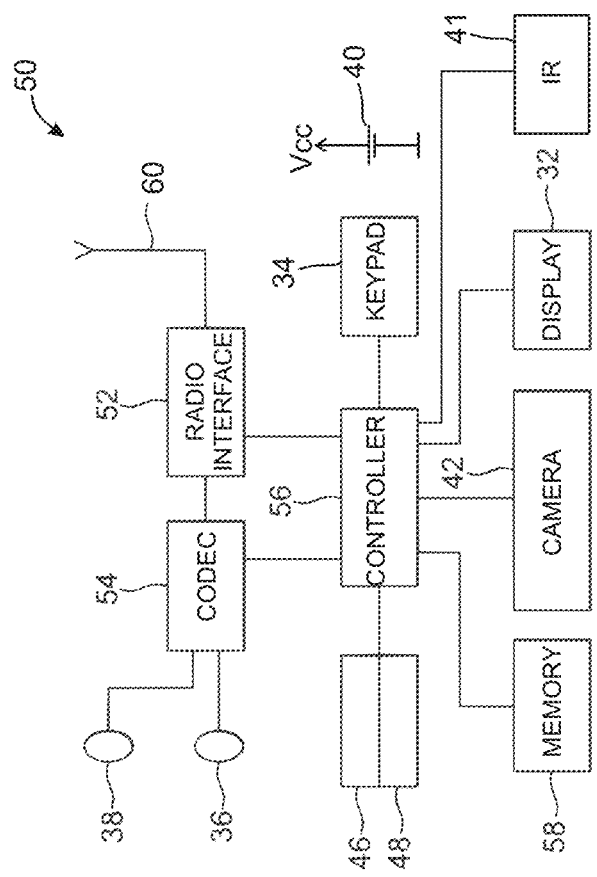
Fig. 10
Fig. 9

APPARATUS, A METHOD AND A COMPUTER PROGRAM FOR VIDEO CODING AND DECODING

TECHNICAL FIELD

The present invention relates to a method for a multi-camera unit, an apparatus for a multi-camera unit, and computer program for a multi-camera unit.

BACKGROUND

A multi-camera unit comprises two or more cameras capable of capturing images and/or video. The cameras may be positioned in different ways with respect to each other camera. For example, in a two-camera unit the cameras may be located at a short distance from each other and they may view to the same direction so that the two-camera unit can provide a stereo view of the environment. In another example, the multi-camera unit may comprise more than two cameras which are located in an omnidirectional manner. Hence, the viewing angle of such a multi-camera unit may be even 360°. In other words, the multi-camera unit may be able to view practically around the multi-camera unit.

Volumetric video may be captured using one or more multi-camera devices (MCDs). When multiple MCDs are in use, the captured footage may be synchronized so that the MCDs provide different viewpoints in the same world. In contrast to traditional 2D/3D video, volumetric video describes a 3D model of the world where the viewer is free to move and look around to observe different parts of the world. The volumetric presentation of the scene is constructed based on the information captured by said several MCDs.

It is foreseeable that various artificial intelligence (AI) techniques are soon capable of inpainting 3D objects into volumetric reconstructions of spaces. Thereupon, it will become possible to utilize the AI for inpainting non-existing objects within the volumetric reconstruction of a space in order to maliciously compromise the space. This creates a potential problem for the integrity of the communication.

SUMMARY

Now in order to at least alleviate the above problems, a method for analyzing presence of objects is introduced herein.

A first aspect comprises a method for analyzing a presence of objects within a first space provided with a capturing system comprising a first plurality of camera devices and a first playback system for reproducing audio and/or visual signals in the first space, the method comprising obtaining a first three-dimensional (3D) volumetric representation of a scene within the first space, generated by a processing unit associated with the capturing system, on the basis of input streams of at least a first and a second camera device, said first 3D volumetric representation comprising at least one object shown within the scene; sending one or more probe signals to the processing unit; controlling the processing unit to reproduce, using the first playback system, one or more audio and/or visual signals on the basis of the probe signals into the space; controlling the processing unit to capture a second 3D volumetric representation of the scene including reproductions of the one or more audio and/or visual signals within the space; and analyzing the reproductions of the one or more audio and/or visual signals captured within the first space whether they correspond to a presumed location of the at least one object shown in the first 3D volumetric representation.

According to an embodiment, the method is performed by a remote unit associated with a second space provided with a capturing system comprising a second plurality of camera devices and a second playback system for reproducing audio and/or visual signals in the second space.

According to an embodiment, at least one apparatus of the first and the second space are configured to communicate with each other, whereupon transmission delays related to the communication are known by the apparatus of the second space.

According to an embodiment, said one or more probe signals are generated using audio patterns sent to one or more loudspeakers of the second space.

According to an embodiment, said one or more probe signals are audio beams outside the frequency range of human auditory system.

According to an embodiment, said one or more probe signals comprise voice signals of one or more persons participating a video conference in the second space.

According to an embodiment, the first space comprises at least one high-speed camera arranged to capture video data from the first space, and the method further comprises analyzing physical movements caused by audio signals reproduced on the basis of said one or more probe signals in the first space by using said high-speed camera.

According to an embodiment, an audio beam of at least one loudspeaker in the first space is focused on at least one object shown in the first 3D volumetric representation.

According to an embodiment, said one or more probe signals are generated using visual patterns sent to a screen in the first space.

According to an embodiment, said one or more probe signals comprise light and/or color changes in the second space captured by the camera of the second space.

According to an embodiment, said analyzing of the reproductions of the one or more audio and/or visual signals within the space is carried out by a neural network.

The second and the third aspects relate to an apparatus and a computer readable storage medium stored with code thereon, which are arranged to carry out the above method and one or more of the embodiments related thereto.

BRIEF DESCRIPTION OF THE DRAWINGS

For better understanding of the present invention, reference will now be made by way of example to the accompanying drawings in which:

FIG. 1a shows an example of a multi-camera unit as a simplified block diagram, in accordance with an embodiment;

FIG. 1b shows a perspective view of a multi-camera unit, in accordance with an embodiment;

FIG. 5 shows a flowchart of a method in accordance with an embodiment;

FIG. 6 shows an example of a system configuration in accordance with an embodiment;

FIG. 7 shows an example of a system configuration in accordance with another embodiment;

FIG. 8 shows an example of a neural network in accordance with an embodiment;

FIG. 9 shows a schematic block diagram of an exemplary apparatus or electronic device;

FIG. 10 shows an apparatus according to an example embodiment;

DETAILED DESCRIPTION OF SOME EXAMPLE EMBODIMENTS

Figure 2:
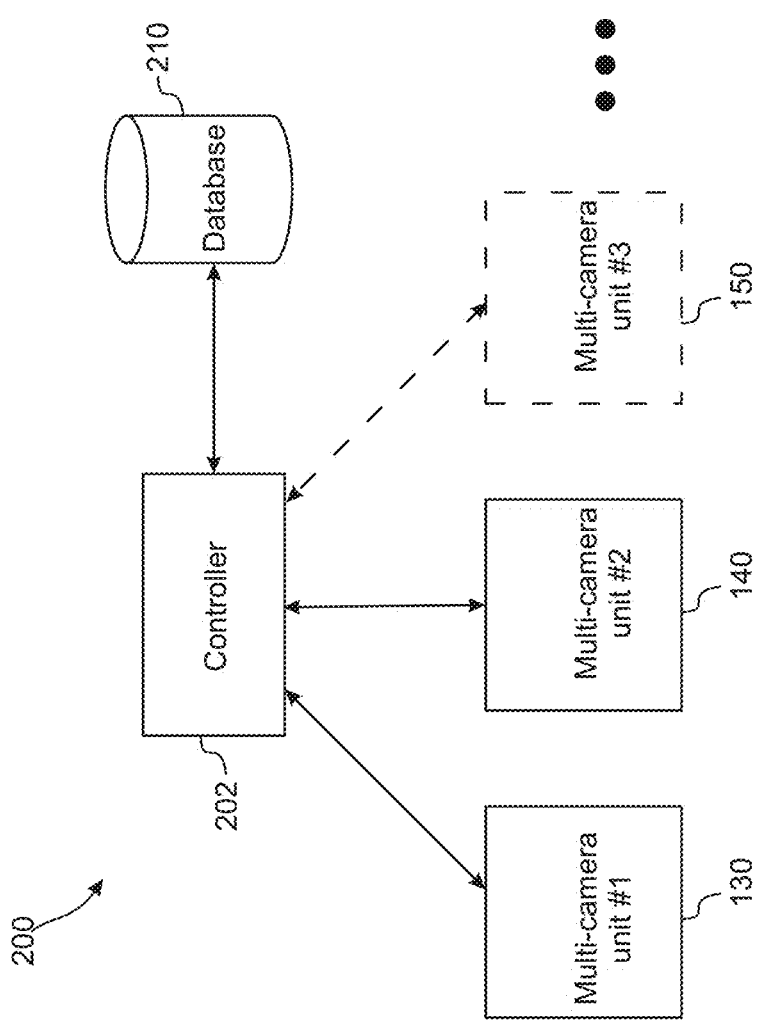
FIG. 2 shows a simplified block diagram of a system comprising a plurality of multi-camera units.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

For illustrating the idea underlying the volumetric reconstruction of spaces (volumetric video), various apparatuses related thereto are described first. FIG. 1*a* illustrates an example of a multi-camera unit 100, which comprises two or more cameras 102. In this example the number of cameras 102 is eight, but may also be less than eight or more than eight. Each camera 102 is located at a different location in the multi-camera unit and may have a different orientation with respect to other cameras 102. As an example, the cameras 102 may have an omnidirectional constellation so that it has a 360° viewing angle in a 3D-space. In other words, such multi-camera unit 100 may be able to see each direction of a scene so that each spot of the scene around the multi-camera unit 100 can be viewed by at least one camera 102.

Without losing generality, any two cameras 102 of the multi-camera unit 100 may be regarded as a pair of cameras 102. Hence, a multi-camera unit of two cameras has only one pair of cameras, a multi-camera unit of three cameras has three pairs of cameras, a multi-camera unit of four cameras has six pairs of cameras, etc. Generally, a multi-camera unit 100 comprising N cameras 102, where N is an integer greater than one, has N(N−1)/2 pairs of cameras 102. Accordingly, images captured by the cameras 102 at a certain time may be considered as N(N−1)/2 pairs of captured images.

The multi-camera unit 100 of FIG. 1*a* may also comprise a processor 104 for controlling the operations of the multi-camera unit 100. There may also be a memory 106 for storing data and computer code to be executed by the processor 104, and a transceiver 108 for communicating with, for example, a communication network and/or other devices in a wireless and/or wired manner. The user device 100 may further comprise a user interface (UI) 110 for displaying information to the user, for generating audible signals and/or for receiving user input. However, the multi-camera unit 100 need not comprise each feature mentioned above, or may comprise other features as well. For example, there may be electric and/or mechanical elements for adjusting and/or controlling optics of the cameras 102 (not shown).

The multi-camera unit 100 of FIG. 1*a* may also comprise devices 128 to calculate the ranging information i.e. the depth of the scene. Such sensors enable the device to calculate all the respective depth information of scene content from the multi-camera unit. Such information results in creating a depth map and may be used in the subsequent processes of this application.

A depth map image may be considered to represent the values related to the distance of the surfaces of the scene objects from a reference location, for example a view point of an observer. A depth map image is an image that may include per-pixel depth information or any similar information. For example, each sample in a depth map image represents the distance of the respective texture sample or samples from the plane on which the camera lies. In other words, if the z axis is along the shooting axis of the cameras (and hence orthogonal to the plane on which the cameras lie), a sample in a depth map image represents the value on the z axis.

Since depth map images are generated containing a depth value for each pixel in the image, they can be depicted as gray-level images or images containing only the luma component. Alternatively chroma components of the depth map images may be set to a pre-defined value, such as a value indicating no chromaticity, e.g. 128 in typical 8-bit chroma sample arrays, where a zero chromaticity level is arranged into the middle of the value range. Alternatively, chroma components of depth map images may be used to contain other picture data, such as any type of monochrome auxiliary pictures, such as alpha planes.

In the cases where a multi-camera unit (a.k.a. multi-camera device, MCD) is in use, another approach to represent the depth values of different views in the stereoscopic or multiview case is to report the disparity between pixels of each view to the adjacent view instead of the actual depth values. The following equation shows how depth values are converted to disparity:

$$D = f \times l \times \left( \frac{d}{2^N - 1} \times \left( \frac{1}{Z_{near}} - \frac{1}{Z_{far}} \right) + \frac{1}{Z_{far}} \right)$$

where:
D=disparity value
f=focal length of capturing camera
l=translational difference between cameras
d=depth map value
N=number of bits representing the depth map values
$Z_{near}$ and $Z_{far}$ are the respective distances of the closest and farthest objects in the scene to the camera (mostly available from the content provider), respectively.

The semantics of depth map values may for example include the following: Each luma sample value in a coded depth view component represents an inverse of real-world distance (Z) value, i.e. 1/Z, normalized in the dynamic range of the luma samples, such as to the range of 0 to 255, inclusive, for 8-bit luma representation. The normalization may be done in a manner where the quantization 1/Z is uniform in terms of disparity. Each luma sample value in a coded depth view component represents an inverse of real-world distance (Z) value, i.e. 1/Z, which is mapped to the dynamic range of the luma samples, such as to the range of 0 to 255, inclusive, for 8-bit luma representation, using a mapping function f(1/Z) or table, such as a piece-wise linear mapping. In other words, depth map values result in applying the function f(1/Z). Each luma sample value in a coded depth view component represents a real-world distance (Z) value normalized in the dynamic range of the luma samples, such as to the range of 0 to 255, inclusive, for 8-bit luma representation. Each luma sample value in a coded depth view component represents a disparity or parallax value from the present depth view to another indicated or derived depth view or view position.

FIG. 1a also illustrates some operational elements which may be implemented, for example, as a computer code in the software of the processor, in a hardware, or both. An occlusion determination element 114 may determine which areas of a panorama image are blocked (occluded) by other multi-camera unit(s); a 2D to 3D converting element 116 may convert 2D images to 3D images and vice versa; and an image reconstruction element 118 may reconstruct images so that occluded areas are reconstructed using image information of the blocking multi-camera unit 100. In accordance with an embodiment, the multi-camera units 100 comprise a location determination unit 124 and an orientation determination unit 126, wherein these units may provide the location and orientation information to the system. The location determination unit 124 and the orientation determination unit 126 may also be implemented as one unit. The operation of the elements will be described later in more detail. It should be noted that there may also be other operational elements in the multi-camera unit 100 than those depicted in FIG. 1a and/or some of the above mentioned elements may be implemented in some other part of a system than the multi-camera unit 100.

FIG. 1b shows as a perspective view an example of an apparatus comprising the multi-camera unit 100. In FIG. 1b seven cameras 102a-102g can be seen, but the multi-camera unit 100 may comprise even more cameras which are not visible from this perspective. FIG. 1b also shows two microphones 112a, 112b, but the apparatus may also comprise one or more than two microphones. Especially, the apparatus may comprise an array of multiple microphones enabling to determine the direction of arrival of an audio signal.

In accordance with an embodiment, the multi-camera unit 100 may be controlled by another device (not shown), wherein the multi-camera unit 100 and the other device may communicate with each other and a user may use a user interface of the other device for entering commands, parameters, etc. and the user may be provided information from the multi-camera unit 100 via the user interface of the other device.

Some terminology regarding the multi-camera unit 100 will now be shortly described. A camera space, or camera coordinates, stands for a coordinate system of an individual camera 102 whereas a world space, or world coordinates, stands for a coordinate system of the multi-camera unit 100 as a whole. An optical flow may be used to describe how objects, surfaces, and edges in a visual scene move or transform, when an observing point moves between from a location of one camera to a location of another camera. In fact, there need not be any actual movement but it may virtually be determined how the view of the scene might change when a viewing point is moved from one camera to another camera. A parallax can be regarded as a displacement or difference in the apparent position of an object when it is viewed along two different lines of sight. The parallax may be measured by the angle or semi-angle of inclination between those two lines.

Intrinsic parameters 120 may comprise, for example, focal length, image sensor format, and principal point. Extrinsic parameters 122 denote the coordinate system transformations from 3D world space to 3D camera space. Equivalently, the extrinsic parameters may be used to define the position of a camera center and camera's heading in world space. It is noted that even though the embodiments below have been described using multi-camera devices as an example, it is appreciated that some embodiments may be also realized using multiple devices having only a single camera. Such devices may be comprise similar elements as multi-camera unit 100.

FIG. 2 is a simplified block diagram of a system 200 comprising a plurality of multi-camera units 130, 140, 150. It should be noted here that different multi-camera units are referred with different reference numbers for clarity, although each multi-camera unit 130, 140, 150 may have similar elements than the multi-camera unit 100 of FIG. 1a. Although FIG. 2 only depicts three multi-camera units 130, 140, 150, the system may have two multi-camera units 130, 140 or more than three multi-camera units. It is assumed that the system 200 has information about the location and orientation of each of the multi-camera units 130, 140, 150 of the system. The location and orientation information may have been stored into a camera database 210. This information may have been entered manually or the system 200 may comprise elements which can determine the location and orientation of each of the multi-camera units 130, 140, 150 of the system. If the location and/or the orientation of any of the multi-camera units 130, 140, 150 changes, the changed location and/or orientation information may be updated in the camera database 210. The system 200 may be controlled by a controller 202, which may be a server or another appropriate element capable of communicating with the multi-camera units 130, 140, 150 and the camera database 810.

The location and/or the orientation of the multi-camera units 130, 140, 150 may not be stored into the database 210 but only to each individual multi-camera unit 130, 140, 150. Hence, the location and/or the orientation of the multi-camera units 130, 140, 150 may be requested from the multi-camera units 130, 140, 150 when needed. As an example, if the first multi-camera unit 130 needs to know the location and orientation of second multi-camera unit 130, the first multi-camera unit 130 may request that information from the second multi-camera unit 140. If some information regarding the second multi-camera unit 140 is still needed, the first multi-camera unit 130 may request the missing information from the controller 202, for example.

The multi-camera system, as disclosed in FIG. 2, may be used to reconstruct multi-camera captured scenes in 3D if the camera locations and pose information are accurately known. Such a reconstruction's quality and coverage depends on the distribution of the cameras and their capture capabilities. Volumetric video may be captured using one or more multi-camera devices (MCDs). When multiple MCDs are in use, the captured footage may be synchronized in the controller 202 so that the MCDs provide different viewpoints in the same world. In contrast to traditional 2D/3D video, volumetric video describes a 3D model of the world where the viewer is free to move and look around to observe different parts of the world.

Figure 3A:
FIGS. 3a-3c show an example illustrating the principle of volumetric video.
Figure 3B:
Figure 3C:
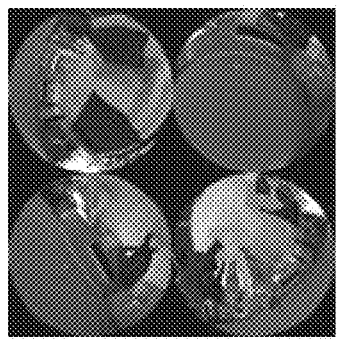

The image sequence of FIG. 3 demonstrates the basic idea underlying the volumetric video. First the controller obtains a plurality of camera frame images (shown in FIG. 3a), depth maps, and camera 3D positions from the plurality of MCDs. The controller constructs an animated 3D model of the world (shown in FIG. 3b) out of this recorded data. When the volumetric video is played back using a head-mounted display (HMD) or any other similar 3D displaying device, the viewer is then able to move within the constructed 3D model, and choose their position and orientation within the model (shown in FIG. 3c). It is noted that the constructed 3D model does not necessarily have to contain video information from the MCDs only, but the constructed 3D model may in addition or alternatively contain objects of augmented reality (AR) or virtual reality (VR).

An application relating to the volumetric video is 3D video-conference, where the volumetric model is continuously sent to a remote location, so that a user in the remote location can feel immersed into the reconstructed room and communicate more naturally with a user in that room.

One approach for the analysis of data in general and of visual data in particular is deep learning. Deep learning is a sub-field of machine learning which has emerged in the recent years. Deep learning typically involves learning of multiple layers of nonlinear processing units, either in supervised or in unsupervised manner. These layers form a hierarchy of layers. Each learned layer extracts feature representations from the input data, where features from lower layers represent low-level semantics (i.e. more abstract concepts). Unsupervised learning applications typically include pattern analysis and supervised learning applications typically include classification of image objects.

Deep learning techniques allow for recognizing and detecting objects in images or videos with great accuracy, outperforming previous methods. A difference of deep learning image recognition technique compared to previous methods is learning to recognize image objects directly from the raw data, whereas previous techniques are based on recognizing the image objects from hand-engineered features (e.g. SIFT features). During the training stage, deep learning techniques build hierarchical layers which extract features of increasingly abstract level.

Thus, an extractor or a feature extractor may be used in deep learning techniques. An example of a feature extractor in deep learning techniques is the Convolutional Neural Network (CNN), shown in FIG. 4. A CNN is composed of one or more convolutional layers with fully connected layers on top. CNNs are easier to train than other deep neural networks and have fewer parameters to be estimated. Therefore, CNNs have turned out to be a highly attractive architecture to use, especially in image and speech applications.

Figure 4:
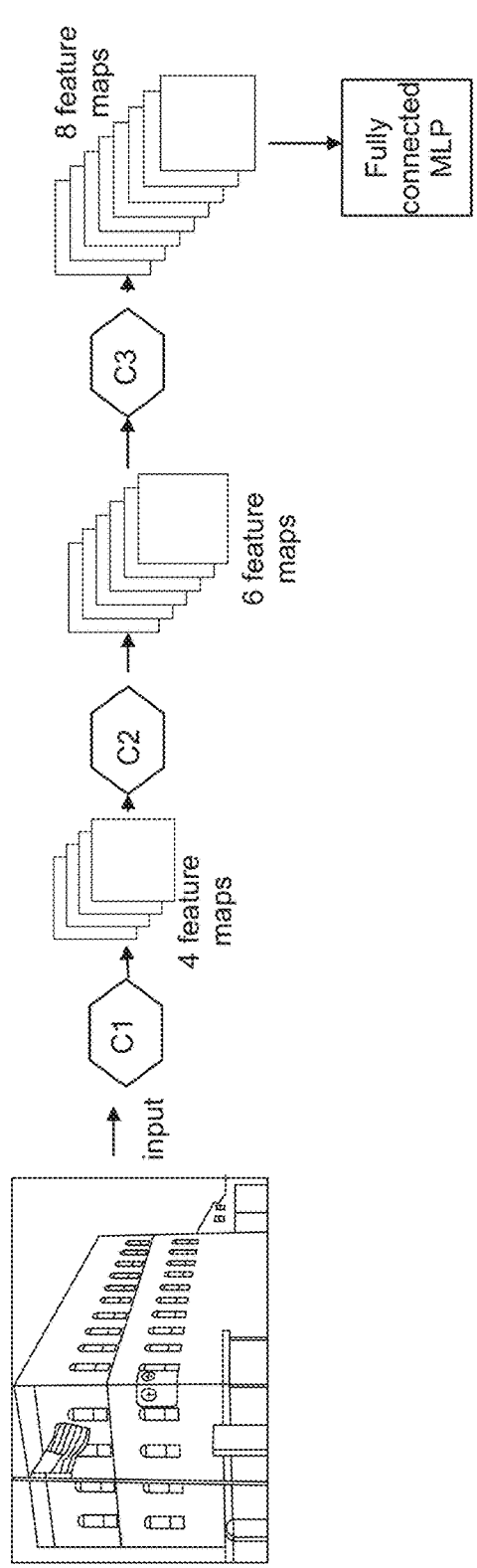
FIG. 4 shows an example of a convolutional neural network.

In FIG. 4, the input to a CNN is an image, but any other media content object, such as video file, could be used as well. Each layer of a CNN represents a certain abstraction (or semantic) level, and the CNN extracts multiple feature maps. The CNN in FIG. 4 has only three feature (or abstraction, or semantic) layers C1, C2, C3 for the sake of simplicity, but current top-performing CNNs may have over 20 feature layers.

The first convolution layer C1 of the CNN consists of extracting 4 feature-maps from the first layer (i.e. from the input image). These maps may represent low-level features found in the input image, such as edges and corners. The second convolution layer C2 of the CNN, consisting of extracting 6 feature-maps from the previous layer, increases the semantic level of extracted features. Similarly, the third convolution layer C3 may represent more abstract concepts found in images, such as combinations of edges and corners, shapes, etc. The last layer of the CNN (fully connected MLP) does not extract feature-maps. Instead, it usually comprises using the feature-maps from the last feature layer in order to predict (recognize) the object class. For example, it may predict that the object in the image is a house.

A neural network has two main modes of operation: training phase and testing phase. The training phase is the development phase, where the network learns to perform the final task. Learning consists in iteratively updating the weights or connections between units. The testing phase is the phase in which the network actually performs the task.

Training can be performed in several ways. The main ones are supervised training, unsupervised training, and reinforcement training. In supervised training, the model is provided with input-output pairs, where the output is usually a label. In supervised training, the network is provided only with input data (and also with output raw data in case of self-supervised training). In reinforcement training, the supervision is more sparse and less precise; instead of input-output pairs, the network gets input data and, sometimes, delayed rewards in the form of scores (E.g., −1, 0, or +1).

Using current artificial intelligence (AI) and deep learning techniques, it is possible to inpaint objects in images in a way that the resulting image looks very realistic. Even though currently computationally challenging, it will soon be possible to inpaint even 3D objects into volumetric reconstructions of spaces.

As the AI techniques are further improved to inpaint 3D objects into volumetric reconstructions of spaces, it will become possible to utilize the AI for inpainting non-existing objects within the volumetric reconstruction of a space, for example based on command (e.g., based on a word or a textual description of the object), in order to maliciously compromise the space. This creates a potential problem for the integrity of the communication.

For example, additional objects (even people) could be introduced in the scene, or the participant could pretend to be in another type of environment. In one particular example, if a person A wants to sell his/her apartment and needs to show it to person B via a video-communication, he/she may utilize an AI to inpaint objects which would raise the value of the apartment. As another example, a person in space A may control an AI to inpaint a different look on himself/herself, such as different clothing, different hairstyle, etc. Also in this case, the integrity of the communication would be impaired. As a further example, video data supplied by video surveillance cameras could be maliciously edited.

Now in order to at least alleviate the above problems, a method for analyzing presence of objects within a space is presented herein.

In the method, which is disclosed in FIG. 5, it is presumed that the space, herein referred to as the first space, is provided with a first capturing system comprising a first plurality of camera devices and a first playback system for reproducing audio and/or visual signals in the first space. The method comprises obtaining (500) a first three-dimensional (3D) volumetric representation of a scene within the first space, generated by a processing unit associated with the capturing system, on the basis of input streams of at least a first and a second camera device, said first 3D volumetric representation comprising at least one object shown within the scene; sending (502) one or more probe signals to the processing unit; controlling (504) the processing unit to reproduce, using the playback system, one or more audio and/or visual signals on the basis of the probe signals into the space; controlling (506) the processing unit to capture a second 3D volumetric representation of the scene including reproductions of the one or more audio and/or visual signals within the first space; and analyzing (508) the reproductions of the one or more audio and/or visual signals captured within the first space whether they correspond to a presumed location of the at least one object shown in the first 3D volumetric representation.

FIG. 6 illustrates an arrangement for the first space according to an embodiment. The space 600, which may be referred to "space A", comprises a processing unit 602 for controlling the operation of the apparatuses in space A. The processing unit may implemented, for example, as central unit of a video conference system, and it may comprise also the functionalities of the controller disclosed in FIG. 2. The space 600 comprises a plurality, at least two, camera devices, such as multicamera devices (MCD) 604, 606, each comprising a plurality of cameras 604a, 606a and at least one microphone 604b, 606b. The space 600 comprises one or more loudspeakers 608, 610 and a display screen 612 for showing e.g. video data of the video conference. The operation of system, as disclosed in FIG. 5, is controlled by a remote unit, which arranged to supply the probe signals to space A and analyse the reproductions.

In the arrangement of FIG. 6, the remote unit carrying out e.g. sending the probe signals and analyzing the reproductions of the one or more audio and/or visual signals within the space may be implemented solely as an AI agent, i.e. a computing device arranged to perform the necessary features.

Thus, a plurality (i.e. 2, 3, 4, 5 or more) of camera devices, such as multicamera devices (MCD) are used to capture 3D video representation of a scene. The multicamera devices are distributed in different locations in respect to the scene, and therefore each multicamera device captures a different 3D video representation of the scene. The 3D video representations captured by each MCD are used as input streams for creating a 3D volumetric representation of the scene. The remote unit then sends probe signals to the processing unit, and controls the processing unit to reproduce, using the playback system, one or more audio and/or visual signals on the basis of the probe signals into the space. For example, in a video conference the processing unit typically automatically reproduces the video data of the video conference via the display screen and loudspeaker. The remote unit controls the processing unit to capture, using the MCDs in space A, a second 3D volumetric representation of the scene including reproductions of the one or more audio and/or visual signals within the space. Then the remote unit, preferably the AI agent therein, may analyze the reproductions of the one or more audio and/or visual signals within the space whether they correspond to a presumed location of the at least one object shown in the first 3D volumetric representation.

Herein, the reproductions of the one or more audio and/or visual signals within the space may refer to audio and/or visual signals directly propagated within said space and captured by a capturing device, such as the MCDs. Alternatively or additionally, the reproductions of the one or more audio and/or visual signals within the space may refer to audio and/or visual signals reflected within said space and captured by the capturing device.

According to an embodiment, the remote unit is associated with a second space provided with a capturing system comprising a plurality of multicamera devices and a playback system for reproducing audio and/or visual signals in the space. Thus, the second space, which may be referred to "space B", may comprise similar arrangement for audio and/or video capturing and reproduction as space A. In addition, space B comprises the remote unit, and preferably the AI agent therein. Thus, the spaces A and B may be provided video conferencing systems, which may establish a mutual video conference and the remote unit, preferably the AI agent therein, may send the probe signal and analyse them as disclosed in the embodiments herein. Alternatively, the remote unit and/or the AI agent may be located outside space B, for example at premises of a video conference service provider.

FIG. 7 shows an arrangement according to another embodiment comprising two physical spaces, space A (700) and space B (710). Herein, the space A may comprise the apparatuses similar to those of FIG. 6, i.e. a capturing system 702 comprising e.g. a plurality of camera units and a microphone array, and a playback system 704 comprising e.g. one or more displays and one or more loudspeakers. The space A may involve a person (user A). The space B may involve a person (user B) and apparatuses similar to space A, i.e. the capturing system 712 and the playback system 714. The apparatuses of spaces A and B may be implemented as video conference systems and the users A and B may establish a video conference with each other. Nevertheless, space B may include the AI agent 716 as the device arranged to perform the necessary features.

The AI agent 716 may communicate with the capturing system 712 of space B to add probe signals to the data provided to the playback system 704 of space A. Space A includes an object 706 at a presumed location. The playback system 704 reproduces the probe signals and at least one or more of probe signals are propagated towards the object 706. If the object 706 is real, the probe signal is reflected to the capturing system 702 as illustrated by the solid line. However, if the object 706 is not real, it will cause a feedback that is different from the expected behaviour for the probe signal, i.e. the reflection as illustrated by the dashed line. The AI agent may then communicate with the playback system 714 of space B to receive the feedback data for the probe signals from capturing system 702 of space A and analyze whether the object 706 is real or not.

Conceptually, FIG. 6 may also be interpreted as disclosing two spaces, space A as a physical space and space B as a virtual space comprising possibly only a computing device implementing the functionalities of the AI agent.

According to an embodiment, at least one apparatuses of the first and the second space are configured to communicate with each other, whereupon transmission delays related to the communication are known by the apparatus of the second space. Thus, for example in a video conference where the communication is almost real-time with insignificant transmission delays, no inpainted objects could be included in the second 3D volumetric representation between reproducing the one or more audio and/or visual signals in the first space and providing the second 3D volumetric representation for analysis in the second space.

According to an embodiment, said one or more probe signals are generated using audio patterns sent to one or more loudspeakers of the second space. Thus, in the embodiment where the second space is a physical space comprising loudspeakers, predetermined audio patterns may be sent to the loudspeakers of space B and the audio patterns reproduced by said loudspeakers are conveyed as an encoded audio signal to the loudspeakers of space A to be reproduced. The audio patterns reproduced in space A are captured by the microphones, such as microphone arrays, located in space A and conveyed as an encoded audio signal to space B for analysis. The effects of the scene in space A on the audio patterns may then be analyzed, for example by analyzing how the audio signal have been reflected from the physical surfaces of space A. According to an embodiment, the one or more probe signals may be computationally embedded in signal(s) captured by capture system B at space B. According to an embodiment, the AI agent may be able to control the playback system A to generate desired probe signals at space A. For example, AI agent may send the one or more probe signals to playback system A as separate probe signal stream(s) or file(s).

According to an embodiment, said one or more probe signals comprise audio beams outside the frequency range of human auditory system. Thus, the probe signals reproduced in space A may comprise audio beams which may be out of the audible range (i.e., out of the 20 Hz-20 KHz range), so that they are not bearable by a person in space A. Thus, persons in space A do not preferably notice that the presence of objects in space A is being analyzed.

According to an embodiment, said one or more probe signals comprise voice signals of one or more persons participating a video conference in the second space. Thus, the voice of a user in space B may be used as implicit audio patterns for providing the probing signal, whereupon the effects of the voice on objects in space A may then be analyzed similarly as described above. Such implicit audio patterns may be used whenever there is a 2-way communication between space A and space B, such as during a videoconference. Also in this embodiment, persons in space A do not preferably notice that the presence of objects in space A is being analyzed.

According to an embodiment, the first space comprises at least one camera, for example a high-speed camera arranged to capture video data from the first space, and the method further comprises analyzing physical movements caused by audio signals reproduced on the basis of said one or more probe signals in the first space by using said high-speed camera. It is known that audio signals may produce very small movement in objects.

Thus, these audio effects may be analyzed on the basis of visual data provided by a high-speed camera, whereupon the surface of objects, especially the more elastic or light-weight objects, may be analyzed by the AI agent to detect if there are infinitesimal movements which are consistent with the audio probing signal. It is noted that while the definition of a high-speed camera may change as the technology advances, herein the high-speed camera is considered to be capable of capturing at least 250 frames per second.

According to an embodiment, an audio beam of at least one loudspeaker in the first space is focused on at least one object shown in the first 3D volumetric representation. Thus, the availability of one or preferably more loudspeakers such as an loudspeaker array, may be leveraged to beamform the probing audio signals to specific "suspicious" objects and then analyze the produced audio or visual effects, as described above. The energy of the probe signal is thereby concentrated to a particular object and therefore the difference between expected and observed behavior in case of an inpainted object is increased. As a very simple example, the loudspeaker that is closest to the detected suspicious object in space A may be used to send the probe signal and a microphone that is on the opposite side of the space A may be used to record the feedback.

The analysis of the effects of the audio probing may consist of analyzing the audio reflections and multi-reflections, such as echo, in space A captured by the microphone in order to check for consistencies with the sent signal.

According to an embodiment, said one or more probe signals are generated using visual patterns sent to a screen in the first space. Thus, the visual patterns are sent to space A to be displayed on the screen and then it may be analyzed how the patterns output by the screen in space A have affected the visual appearance of space A, as captured by the cameras in space A. Visual patterns may be light or color patterns which are encoded into the video bitstream sent to the playback system and which are then displayed by the screen in space A, and then captured and sent back to space B. The analysis may consist of verifying that visual reflections and shadows are consistent with the sent pattern and the volumetric reconstruction of the space.

According to an embodiment, said one or more probe signals comprise light and/or color changes in the second space captured by the camera of the second space. This provides a possibility to use implicit probing in a 2-way communication, where space B may be altered by using local light or color changes, which will be captured by local cameras and sent to space A's screen. In addition, after capturing light and/or color changes in space B, an explicit visual probe signal may be added in the video bitstream sent from space B to A.

The analysis of the effects of the audio probing may consist of analyzing light reflections, shadows and similar aspects. Explicit light patterns may be out of the visible range, which may be detected if the camera in space A have a wide spectrum. Explicit light patterns may also be in the visible range but with undistinguishable properties for humans, such as an extremely-slowly changing color.

FIG. 8 shows an example for implementing the AI agent as a neural network according to an embodiment. The AI agent may be implemented as a neural encoder-decoder network comprising an encoder arranged to obtain an input image, extract feature maps at multiple layers, and output the feature maps from the last layer. A decoder is arranged to obtain feature maps from the last layer of the encoder and reconstruct the image with multiple layers of computation. Thus, the data is encoded into a lower-dimensional vector (the feature maps) and when decoding, reconstructed from said vector.

The structure of the encoder and the decoder can be any type but, for visual analysis, the most common structure is a convolutional network (CNN) for the encoder and a de-convolutional network (de-CNN) for the decoder.

The AI agent may be implemented as a neural network for each data modality (audio and video). For example, in the case of video, the neural net may be a convolutional LSTM classifier which receives the video stream from space A, is conditioned on the sent visual probing signal, and outputs a binary class or a binary probability distribution expressing the realism of the received 3D reconstruction of space A.

Training such a neural network may be carried out by using a large 3D video dataset where random light patterns are shown on screens, and where a second neural net occasionally inpaints objects.

In case of audio probe signals, instead of using 2D convolutions as feature extractors, 1D convolutions may be used at the initial layers of the neural network. Then, as for video, a recurrent neural net such as the LSTM may be used to extract temporal features. The training may be carried out similarly to the video implementation, but by using predetermined types of audio patterns.

In FIG. 8, the neural network generates a probe signal, which may be combined with the video and audio content captured from space B. The original content from space B together with the probe signals is transmitted through the communication channel to space A, where the original content from space B and the probe signals are output using the playback devices in space A. The content as played back in space A is captured, and input to the neural network for analysis.

As becomes evident from the above, significant advantages may be obtained through one or more of the disclosed embodiments. Along with the rise of AI and deep learning technologies which allow to modify real content in unperceptible way for humans, the embodiment provide a straightforward possibility to verify the authenticity of content. The above problem may become relevant especially in the context of VR and AR technologies, but the embodiment are directed to volumetric reconstruction of spaces, thereby counteracting the manipulation of content in such technologies as well.

The following describes in further detail suitable apparatus and possible mechanisms for implementing the embodiments of the invention. In this regard reference is first made to FIG. 9 which shows a schematic block diagram of an exemplary apparatus or electronic device 50 depicted in FIG. 10, which may incorporate a processing unit according to an embodiment of the invention.

The electronic device 50 may for example be a mobile terminal or user equipment of a wireless communication system. However, it would be appreciated that embodiments of the invention may be implemented within any electronic device or apparatus which may include a capability of transmitting radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/FireWire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and a universal integrated circuit card for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 60 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 11:
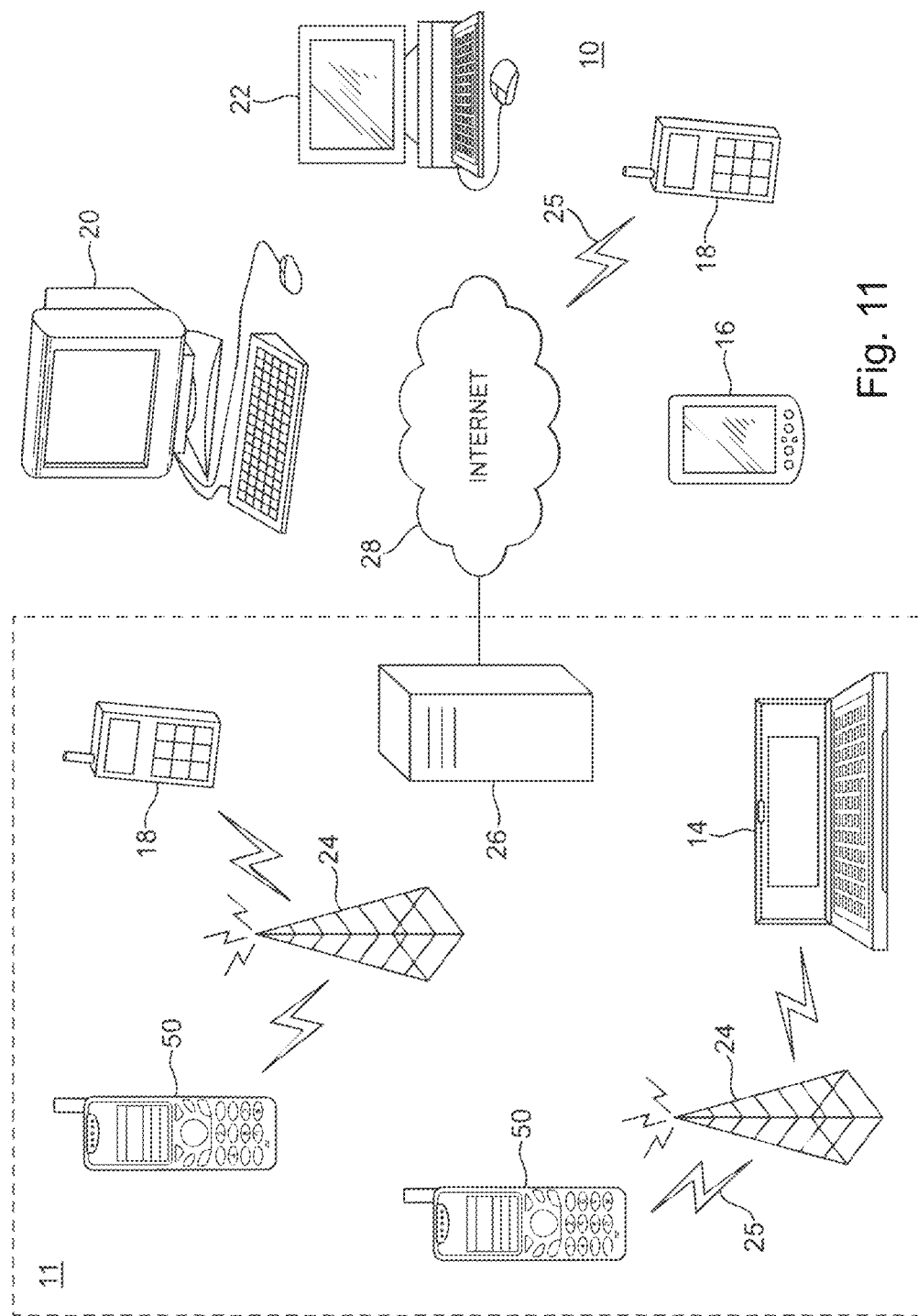
FIG. 11 shows an example of an arrangement for wireless communication comprising a plurality of apparatuses, networks and network elements.

With respect to FIG. 11, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a global systems for mobile communications (GSM), universal mobile telecommunications system (UMTS), long term evolution (LTE) based network, code division multiple access (CDMA) network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 11 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method for analyzing a presence of objects within a first space provided with a capturing system comprising a first plurality of camera devices and a first playback system for reproducing audio and/or visual signals in the first space, the method comprising:
   obtaining a first three-dimensional (3D) volumetric representation of a scene within the first space, said first 3D volumetric representation being generated by a processing unit associated with the capturing system, on the basis of input streams of at least a first and a second camera device, said first 3D volumetric representation comprising at least one object shown within the scene;
   sending one or more probe signals to the processing unit;
   controlling the processing unit to reproduce, using the first playback system, one or more audio and/or visual signals on the basis of the probe signals into the first space;
   controlling the processing unit to capture a second 3D volumetric representation of the scene including reproductions of the one or more audio and/or visual signals within the first space; and
   analyzing the reproductions of the one or more audio and/or visual signals captured within the first space to determine whether said reproductions correspond to a presumed location of the at least one object shown in the first 3D volumetric representation.

2. The method according to claim 1, wherein the method is performed by a remote unit associated with a second space provided with a second capturing system comprising a second plurality of camera devices and a second playback system for reproducing audio and/or visual signals in the second space.

3. The method according to claim 1, wherein at least one apparatus in each of the first and the second spaces is configured to communicate with each other, whereupon transmission delays related to the communication are known by the apparatus of the second space.

4. The method according to claim 1, wherein said one or more probe signals are generated using audio patterns sent to one or more loudspeakers of the first space.

5. The method according to claim 4, wherein said one or more probe signals comprise audio beams outside the frequency range of human auditory system.

6. The method according to claim 4, wherein said one or more probe signals comprise voice signals of one or more persons participating a video conference in the first space.

7. The method according to claim 1, the method further comprises analyzing physical movements caused by audio signals reproduced on the basis of said one or more probe signals in the first space by using a camera.

8. The method according claim 7, wherein an audio beam of at least one loudspeaker in the first space is focused on at least one object shown in the first 3D volumetric representation.

9. The method according to claim 1, wherein said one or more probe signals are generated using visual patterns sent to a screen in the first space.

10. An apparatus comprising:
   at least one processor and at least one memory, said at least one memory stored with code thereon, which, when executed by said at least one processor, causes the apparatus to:
   obtain a first three-dimensional (3D) volumetric representation of a scene within a first space, said first 3D volumetric representation comprising at least one object shown within the scene, wherein said 3D volumetric representation has been generated by a processing unit associated with a capturing system comprising a first plurality of camera devices and a first playback system for reproducing audio and/or visual signals in the first space on the basis of input streams of at least a first and a second camera device;
   send one or more probe signals to the processing unit;
   control the processing unit to reproduce, using the first playback system, one or more audio and/or visual signals on the basis of the probe signals into the first space;
   control the processing unit to capture a second 3D volumetric representation of the scene including reproductions of the one or more audio and/or visual signals within the first space; and
   analyze the reproductions of the one or more audio and/or visual signals captured within the first space to determine whether said reproductions correspond to a presumed location of the at least one object shown in the first 3D volumetric representation.

11. The apparatus according to claim 10, wherein the apparatus is associated with a second space provided with a second capturing system comprising a second plurality of camera devices and a second playback system for reproducing audio and/or visual signals in the second space.

12. The apparatus according to claim 11, wherein the apparatus is further caused to communicate with at least one apparatus of the first space, whereupon transmission delays related to the communication are known by the apparatus.

13. The apparatus according to claim 10, wherein the apparatus is further caused to generate said one or more probe signals using audio patterns sent to one or more loudspeakers of the first space.

14. The apparatus according to claim 13, wherein said one or more probe signals are audio beams outside the frequency range of human auditory system.

15. The method according to claim 13, wherein said one or more probe signals comprise voice signals of one or more persons participating a video conference in the first space.

16. The apparatus according to claim 10, wherein the apparatus is further caused to obtain video data captured by a camera in the first space and to analyze physical movements caused by audio signals reproduced on the basis of said one or more probe signals in the first space from said video data.

17. The apparatus according to claim 10, wherein the apparatus is further caused to generate said one or more probe signals using visual patterns sent to a screen in the first space.

18. The apparatus according to claim 17, wherein said one or more probe signals comprise light and/or color changes in the second space captured by the camera of the second space.

19. The apparatus according to claim 10, wherein the apparatus is further caused to analyze the reproductions of the one or more audio and/or visual signals within the first space by using a neural network.

20. A non-transitory computer-readable storage medium stored with code thereon for use by an apparatus, which code, when executed by a processor, causes the apparatus to:
obtain a first three-dimensional (3D) volumetric representation of a scene within a first space, said first 3D volumetric representation being generated by a processing unit associated with a capturing system, on the basis of input streams of at least a first and a second camera device, said first 3D volumetric representation comprising at least one object shown within the scene;
send one or more probe signals to the processing unit;
control the processing unit to reproduce, using a first playback system, one or more audio and/or visual signals on the basis of the probe signals into the first space;
control the processing unit to capture a second 3D volumetric representation of the scene including reproductions of the one or more audio and/or visual signals within the first space; and
analyze the reproductions of the one or more audio and/or visual signals captured within the first space to determine whether said reproductions correspond to a presumed location of the at least one object shown in the first 3D volumetric representation.

* * * * *